United States Patent Office 2,760,880
Patented Aug. 28, 1956

2,760,880

METHOD FOR MAKING COMPOSITE TITANIUM DIOXIDE PIGMENT MATERIAL

William Grave, Livingston, N. J., assignor to National Lead Company, New York, N. Y., a corporation of New Jersey No Drawing. Application July 10, 1953,
Serial No. 367,363

7 Claims. (Cl. 106—300)

The present invention relates in general to the treatment of titanium-bearing materials to form hydrated or dehydrated titanium oxides, and in particular to a process for preparing a composite titanium dioxide hydrate which may be calcined directly to pigment material having the structure of rutile.

At the present time processes for the manufacture of titanium dioxide pigments for commercial use depend almost exclusively upon the reaction of titaniferous bearing materials and in particular ilmenite with sulfuric acid. Ilmenite is a mineral which, in general, may be referred to as an iron titanate ($FeTiO_3$) and is composed principally of titanium oxide and iron fractions in the form of ferric oxide and ferrous oxide.

In the treatment of ilmenite with concentrated sulfuric acid, the ore is finely ground usually to about 200 mesh and the mixture heated until a reaction between the ilmenite and acid sets in. The digestion cake which results from this reaction is then dissolved in water and the ferric iron values reduced to ferrous iron by adding metallic iron to the solution whereupon a so-called extender such as, for example calcium sulfate, is added to the sulfate solution and the mixture boiled (hydrolyzed) until substantially all of the titanium is precipitated out as a composite hydrolysate, having the form of an anatase titanium dioxide modification, which is subsequently filtered, washed and calcined to produce a composite pigment material.

Modifications of this procedure include the methods of adding the extender in the form of an aqueous slurry to a precipitated titanium dioxide hydrate; or mixing the aqueous slurry extender into a titanium sulfate solution prior to hydrolysis.

However, in these and in all previously known methods of preparing composite titanium dioxide pigment material from the hydrolysate of an ilmenite ore sulfate solution, the calcined hydrolysate has remained substantially in the form of anatase, and hence it has been customary to treat the hydrolysate, before calcination, with a suitable promoter to cause the anatase modification to convert to the rutile modification so that the calcined pigment will possess the characteristic whiteness of color, fine particle size, soft texture, improved tinting strength and other well-known characteristics of a pigmentary titanium dioxide of rutile structure.

An object of the present invention is to provide an improved method of producing a composite titanium dioxide pigment of rutile structure.

A further object of the invention is to provide a method for precipitating a titanium hydrate upon an extender to form a composite titanium dioxide hydrate which, when calcined within a temperature range suitable for optimum pigmentary particle size and without the addition of a promoter, will form a rutile pigment.

A still further object of the invention is to form a readily convertible titanium hydrate from a titaniferous slag sulfate solution and to precipitate the hydrate on an extender to form a composite hydrate of the anatase modification which when calcined without the addition of a promoter will form a composite titanium dioxide pigment of optimum particle size and of rutile structure.

These and other objects of the invention will become more apparent from the following more complete description and claims.

In its broadest aspects, the present invention relates to the discovery that an anatase hydrate precipitated by hydrolysis from a titaniferous slag sulfate solution onto an extender may, upon calcination within a temperature range suitable for optimum pigmentary particle size, be converted directly to a composite titanium dioxide pigment having the structure of rutile. In particular, the invention relates to a method of preparing a composite titanium dioxide rutile pigment by mixing an extender with a sulfate solution prepared from a titaniferous slag and having an iron sulfate to titanium dioxide ratio within the range of from about 0.6 to about 2.0, on a weight basis, adjusting the acid concentration of the admixture at hydrolysis within the range of from 16% to 18%, heating the admixture to boiling for a sufficient length of time to coprecipitate the titanium dioxide hydrate and extender; and then calcining the washed composite hydrate directly to convert the anatase titanium modification to rutile.

The term "composite" as used in conjunction with the hydrate and calcined pigment shall be understood to connote the use, at hydrolysis, of an extender such as, for example barium of calcium sulfate, upon which the titanium dioxide hydrate is deposited as a coalesced precipitate. Although calcium sulfate anhydrite, barium sulfate or strontium sulfate may be used as extenders, it has been found that calcium sulfate anhydrite is highly satisfactory from a commercial standpoint, and hence the extender referred to in describing and illustrating the present invention will be calcium sulfate anhydrite, the composite pigment formed from the coprecipitated hydrate being sometimes termed a calcium base pigment.

The titaniferous slag used in carrying out the process of this invention may be obtained by smelting titaniferous iron ores in the presence of a carbonaceous reducing agent to produce slag which has a low iron fraction but which is rich in titanium values. By way of example, a typical slag for carrying out the process of this invention has the following analysis:

|  | Percent |
|---|---|
| $TiO_2$ | 65–75 |
| FeO | 2–5 |
| $SiO_2$ | 3–5 |
| CaO | 6–10 |
| MgO | 8–10 |
| $Al_2O_3$ | 3–5 |

The titanium sulfate slag solution is prepared from a slag of substantially the composition given above by digesting the titaniferous slag with concentrated sulfuric acid. Specifically, the digestion treatment comprises mixing the ground slag, having a particle size of about 200 mesh, with concentrated (96%) sulfuric acid at a 100% acid to slag ratio within the range of from about 1.6 to about 1.65 parts acid to one part slag, heating the mixture for from ¼ to ½ hour at a temperature of from 25 to 120° C., and thereafter adjusting the acid concentration for reaction to from about 86% to 88% and continuing the reaction until a digestion cake steps up. The digestion cake is then cut with water and the solution filtered to form a clarified titanium sulfate slag solution having a $TiO_2$ content of from 180 to 210 grams per liter.

By employing a slag of the above analysis, the amount of iron remaining in the sulfate solution is extremely small, usually below about 0.3%, the ratio of iron sulfate to titanium dioxide being less than 0.2. It will be appreciated, however, that when slags analyzed as having higher iron content are used, the ratio of iron sulfate to titanium dioxide in the sulfate solution may be higher.

While an exact knowledge of the nature of the chemical and/or mechanical reaction which takes place during hydrolysis of an admixture of the sulfate slag solution and an extender to produce a composite anatase hydrate capable of being converted to the rutile structure directly by calcination is not known, it has been discovered that the success of the process depends in large measure upon establishing a preferred ratio of iron sulfate to titanium dioxide in the sulfate solution prior to hydrolysis; and that this ratio must co-exist with a preferred sulfuric acid concentration at hydrolysis. In view of the discoveries, it has been postulated that the new highly beneficial and wholly unexpected results achieved by this invention are due to the inherent characteristics of the sulfate slag solution i. e. to the iso-electric effect of the iron sulfate and sulfuric acid concentration upon the titanium colloids precipitated from the sulfate slag solution, in that hydrates of a specific composition and particle size are removed from the sulfate solution by flocculation at an early stage.

In general, the amount of iron sulfate in the slag solution prior to hydrolysis affects the percent rutilization of the calcined composite hydrate, this effect being dependent also upon the sulfuric acid concentration of the sulfate solution at hydrolysis. It has been discovered that for sulfate slag solutions having a ratio of iron sulfate to titanium dioxide of less than about 0.2 and a low acid concentration of about 17% at hydrolysis, the percent rutilization of the composite calcined hydrate will be about 30%; whereas with higher sulfuric acid concentrations, the percent rutilization of the composite calcined hydrate is generally lower. With higher ratios of iron sulfate to titanium dioxide in the sulfate slag solution such as, for example about 1.0 and somewhat higher concentrations of acid at hydrolysis, as for example about 18%, the percent rutilization of the composite calcium hydrate is quite consistently as high as about 75 to 85%; and again higher acid concentrations at hydrolysis effect lower conversions to rutile. At even higher ratios of iron sulfate to titanium dioxide, as for example of the order of 1.5, then for an acid concentration of about 18.5% at hydrolysis, the conversion of the composite calcined hydrate to rutile is as high as from 90 to 95%, the percent rutilization of the calcined composite hydrate being lower, however, at higher acid concentrations.

It is evident, therefore, that the ratio of iron sulfate to titanium dioxide in the sulfate slag solution and the concentration of sulfuric acid at hydrolysis are critical factors affecting the percent rutilization of the composite calcined hydrate; that the ratio of iron sulfate to titanium dioxide in the sulfate slag solution lies within a critical range from about 0.6 to about 2.0; and that the concentration of sulfuric acid at hydrolysis lies within a critical range of from 16% to about 18%. For maximum conversions to rutile the ratio of iron sulfate to titanium dioxide in the sulfate slag solution is about 1.5 and the acid concentration at hydrolysis is about 18.5.

The ratio of iron sulfate to titanium dioxide in the sulfate slag solution may be controlled in any one of several ways provided the iron is in a form which is soluble in the solution. Thus, the required ratio of iron sulfate to titanium dioxide may be arrived at by mixing a finely ground ore, such as ilmenite, with the ground slag prior to digestion; or by preparing a sulfate solution of ore and a sulfate solution of slag and mixing the two sulfate solutions prior to hydrolysis. However, inasmuch as the iron content of most titaniferous ores is relatively high, the ratio of ore to slag, based on the iron values, would necessarily have to be extremely small. As used in the instant application, the term "titanium sulfate slag solution" shall be understood to mean a sulfate solution prepared by the use of a titaniferous slag either alone or in conjunction with other titaniferous materials in the manners hereinafter described.

Preferably, a titaniferous slag is used and more especially, a titaniferous slag of low iron content such that the ratio of iron sulfate to titanium dioxide in the sulfate solution is less than about 0.6, such that the preferred ratio of iron to titanium dioxide may be selectively controlled by introducing additional iron into the solution in the form of ferrous sulfate crystals ($FeSO_4 \cdot xH_2O$) which dissolve readily in the solution upon heating to temperatures from 50 to 60° C.

In instances wherein the titaniferous slag is itself of sufficiently high iron content such that upon digestion and clarification, the resulting titanium sulfate has a ratio of iron sulfate to titanium dioxide within the critical range specified above, then no additional iron values need be added to the solution. As a corollary, should the slag have an unusually high iron content, then the digestion and subsequent treatment of the sulfate slag solution must be adjusted to hold the ratio of iron sulfate to titanium dioxide within the limits specified.

As pointed out above, the hydrolysis of the sulfate slag solution for precipitating a composite hydrate is accomplished by introducing into the sulfate slag solution or otherwise admixing therewith, preferably prior to hydrolysis, an extender such as, for example, a slurry of calcium sulfate anhydride ($CaSO_4$) prepared as described in U. S. Patent No. 1,906,730, Washburn, May 2, 1933, and the U. S. patents referred to therein. Although a calcium sulfate slurry may be used to advantage as an extender in the manufacturing of composite titanium pigment by this invention, it will be understood that other extenders may be used, as for example blanc fixe, natural silica, etc.

Hydrolysis of the sulfate slag solution, in which the ratio of iron sulfate to titanium dioxide has been adjusted preferably by the addition of iron sulfate crystals to the sulfate solution prior to hydrolysis, is carried out by mixing the sulfate slag solution with calcium sulfate, preferably as an aqueous slurry of 30% solids, and then heating the admixture and maintaining it at nearly the boiling point for about four hours until a major portion of the composite hydrate has been precipitated. The composite hydrate which is a titanium dioxide anatase modification easily convertible to rutile by calcination is then filtered or otherwise separated from the mother liquor and washed with a suitable acid to remove excess alkali and sulfates.

The rutilization of the washed composite hydrate is effected directly, that is to say without the use of a rutile promoter before calcination, and is carried out under relatively conventional conditions, the calcination temperatures ranging from 900° C. to 975° C. and the time of calcination ranging from three to four hours, the temperatures of calcination being increased periodically during calcination.

A calcined titanium dioxide pigment material obtained by the process of this invention exhibits high tinting strength, clear white color, soft texture with 80 to 90% of the pigment being in the form of rutile.

EXAMPLE I

A slag of the above analysis was ground to a particle size of about 200 mesh and digested in concentrated (96%) sulfuric acid at a 100% acid to slag ratio of 1.6. The resulting digestion cake was dissolved in water and the solution clarified by filtration. This slag solution had the following analysis:

| | |
|---|---|
| Specific gravity | 1.540 |
| Total $TiO_2$ ____grams per liter__ | 226.2 |
| $H_2SO_4$ ____do____ | 466.0 |
| $FeSO_4$ ____do____ | 44.2 |
| $H_2SO_4/TiO_2$ | 2.06 |
| $FeSO_4/TiO_2$ | 0.195 |

In preparing the hydrolysis slurry for the precipitation of the titanium dioxide hydrate, 612 parts of this slag solution, by weight, were mixed with 704 parts of an aqueous calcium sulfate slurry of 32% solids. The admixture had the following analysis:

| | |
|---|---|
| $TiO_2$ grams per liter | 90.0 |
| $H_2SO_4$ do | 248.0 |
| $FeSO_4$ do | 17.6 |
| $CaSO_4/TiO_2$ | 2.5 |
| $FeSO_4/TiO_2$ | 0.195 |

The mixture was then hydrolyzed by heating and maintaining it at the boiling point for about four hours at the end of which time 92.8% of the titanium dioxide was precipitated. The impurities were then removed from the hydrate by filtering and washing, and thereafter the washed hydrate was calcined for four hours at 900–975° C. Upon analysis of the calcined pigment it was found that about 10% of the anatase titanium dioxide modification had been converted to the rutile structure. The disintegrated pigment had a tinting strength of about 495 points (Reynolds number), and the color in oil was about 8.5.

EXAMPLE II

A slag solution was prepared, as described in Example I above, to which was added $FeSO_4 \cdot 5H_2O$ crystals, before clarification of the solution, to increase the ratio of ferrous sulfate to titanium dioxide from 0.195 to 0.99. The clarified slag solution analyzed as follows:

| | |
|---|---|
| Specific gravity | 1.607 |
| Total $TiO_2$ grams per liter | 200.0 |
| $H_2SO_4$ do | 412.0 |
| $FeSO_4$ do | 198.0 |
| $H_2SO_4/TiO_2$ | 2.060 |
| $FeSO_4/TiO_2$ | 0.99 |

The slag solution was then added to an aqueous calcium sulfate slurry of 32% solids as described in Example I above and the resulting mixture had the following analysis:

| | |
|---|---|
| $TiO_2$ grams per liter | 90.0 |
| $H_2SO_4$ do | 248.0 |
| $FeSO_4$ do | 89.3 |
| $CaSO_4/TiO_2$ | 2.5 |
| $FeSO_4/TiO_2$ | 0.99 |

The mixture was boiled for about four hours at the end of which time 92.6% of the titanium dioxide was precipitated out as an anatase titanium dioxide hydrate. The hydrate was then washed free of harmful impurities and then calcined under substantially identical temperature conditions as described in Example I above. Upon analyzing the calcined pigment, it was found that substantially 80% of the anatase modification of the titanium dioxide had been converted to the rutile structure. The disintegrated calcined pigment had a tinting strength of 580 points and a color in oil of 8.5.

EXAMPLE III

A slag solution as prepared in Example I was used to which was added $FeSO_4 \cdot 5H_2O$ crystals in an amount to increase the ratio of ferrous sulfate to titanium dioxide to 1.48 prior to clarification. The clarified solution had the following analysis:

| | |
|---|---|
| Specific gravity | 1.612 |
| Total $TiO_2$ grams per liter | 178.0 |
| $H_2SO_4$ do | 372.0 |
| $FeSO_4$ do | 263.5 |
| $H_2SO_4/TiO_2$ | 2.09 |
| $FeSO_4/TiO_2$ | 1.48 |

This slag solution was then mixed with a calcium sulfate slurry in the manner described in Example I to form a solution which analyzed as follows:

| | |
|---|---|
| $TiO_2$ grams per liter | 90.0 |
| $H_2SO_4$ do | 248.0 |
| $FeSO_4$ do | 134.0 |
| $CaSO_4/TiO_2$ | 2.5 |

The mixture was then hydrolyzed by boiling for four hours at the end of which time about 91.6% of the total titanium dioxide was precipitated out as the anatase titanium dioxide hydrate. The hydrate was purified by washing to remove the harmful impurities and then calcined under substantially identical conditions as described in Examples I and II. Upon analyzing the calcined pigment it was found that substantially 90% of the anatase modification had been converted to the rutile structure. The disintegrated calcined pigment had a tinting strength of 560 points and a color in oil of 7.

At this point it should be pointed out that it is generally known in the art that increasing the concentration of sulfuric acid in a sulfate solution normally decreases the convertibility of the anatase titanium dioxide modification to the rutile structure. In Examples I, II and III the effect of various ratios of iron sulfate to titanium dioxide on the rutilization of the anatase titanium dioxide composite hydrate were given for constant concentrations of titanium dioxide and sulfuric acid. However, it has been discovered that by utilizing sulfate solutions prepared as described in the above examples and having the ratio of ferrous sulfate to titanium dioxide within the range of from 0.6 to 2, the convertibility of the anatase hydrate to rutile upon calcination actually increases with an increase in acid concentration. This is illustrated in the following example.

EXAMPLE IV

To a slag solution prepared as described in Example I were added various amounts of $FeSO_4 \cdot 5H_2O$ crystals and sulfuric acid to form solutions A, A', B, B' and C, C' as indicated in the table below. To each of the resulting solutions was mixed a calcium sulfate slurry whereupon each mixture was hydrolyzed by boiling for four hours to precipitate out an anatase titanium dioxide hydrate. The latter were washed to remove impurities and then calcined under identical conditions to convert the anatase modification to rutile. The calcined pigments formed from these various solutions were then analyzed for percent conversion to rutile.

*Analysis of hydrolysis liquor*

| | A | A' | B | B' | C | C' |
|---|---|---|---|---|---|---|
| $TiO_2$, grams per liter | 90.0 | 90.0 | 90.0 | 90.0 | 90.0 | 90.0 |
| $H_2SO_4$, grams per liter | 217.0 | 248.0 | 248.0 | 266.0 | 248.0 | 276.0 |
| $FeSO_4$, grams per liter | 17.6 | 17.6 | 89.3 | 89.3 | 134.0 | 134.0 |
| $CaSO_4/TiO_2$ | 2.5 | 2.5 | 2.5 | 2.5 | 2.5 | 2.5 |
| $TiO_2$ Precipitated, percent | 88.0 | 92.6 | 92.6 | 93.1 | 91.6 | 93.2 |

*Percent Rutile in the Calcined $TiO_2$ Component of the Pigments*

| | | | | | | |
|---|---|---|---|---|---|---|
| Rutile, percent | 30 | 10 | 80 | 30 | 90 | 60 |

The table above gives the analysis of the six hydrolysis liquors wherein the prime solutions differ from their respective parent solutions only in that the amount of sulfuric acid has been increased. It will be seen that the percent anatase titanium dioxide hydrate precipitated from the prime solutions, i. e. solutions A', B' and C', is greater than the percent hydrate precipitated from their respective parent solutions A, B and C. Moreover, although it is evident, by comparing any one parent solution with its respective prime solution, that the higher concentration of acid in the prime solution diminishes the percent convertibility of its anatase titanium dioxide modification to rutile, nevertheless a comparison of the prime solutions A', B' and C' shows that there is an increase in convertibility to rutile with the increase in acid concentration.

By way of comparing the results achieved by the use of a sulfate solution produced from an ilmenite ore alone, a hydrolysis liquor was prepared from ilmenite ore and the ratio of iron sulfate to titanium dioxide was adjusted to about 1. After clarification the solution was mixed with calcium sulfate slurry and hydrolyzed in the manner hereinabove described, the sulfuric acid concentration of the hydrolysis liquor at hydrolysis being about 18.9%. Upon calcining the anatase titanium dioxide hydrate, substantially none or at least no more than 1 or 2% of the anatase modification was converted to rutile. It is noteworthy that in this example the ratio of iron sulfate to titanium dioxide in the sulfate solution and sulfuric acid concentration at hydrolysis were comparable to the values used in Example II described above which produced a composite hydrate characterized by a conversion of rutile of about 80%.

From the foregoing description it will be clear that the discovery that by selectively controlling the ratio of ferrous sulfate to titanium dioxide in hydrolysis liquors to within a critical range of from 0.6 to 2 on a weight basis, and that by limiting the acid concentration at hydrolysis to within the range of from 16 to 18%, the anatase titanium dioxide modification precipitated from the sulfate solution will, upon calcination, convert to rutile without the addition of a promoter; and that the percent conversion to rutile will be within the range of from 75 to 95%. In the preferred process the sulfate solution is prepared from a titaniferous slag only, but it is within the purview of the invention to form the sulfate solution from the digest of a mixture of a slag and a titaniferous ore or from an admixture of sulfate solutions prepared from titaniferous slags and ores respectively.

While this invention has been described and illustrated by the examples shown, it is not intended to be strictly limited thereto, and other variations and modifications may be employed within the scope of the following claims.

I claim:

1. A process for the manufacture of a composite pigment material comprising titanium dioxide in rutile form and an extender consisting of the steps of: boiling an admixture comprising an extender selected from the group consisting of calcium sulfate, barium sulfate and strontium sulfate and a titanium sulfate slag solution wherein the ratio of iron sulfate to titanium dioxide is in the range of from about 0.6 to about 2.0 to precipitate a composite hydrate; adjusting the sulfuric acid concentration of the admixture to from about 16% to about 18%; and calcining the composite hydrate at a temperature from about 900° C. to about 975° C. to convert the calcined composite hydrate to rutile.

2. A process for the manufacture of a composite pigment material comprising titanium dioxide in rutile form and calcium sulfate in the anhydrite form consisting of the steps of: forming a titanium sulfate slag solution wherein the ratio of iron sulfate to titanium dioxide is in the range of from 0.6 to about 2.0; mixing said slag solution with an aqueous calcium sulfate slurry; adjusting the sulfuric acid concentration of the admixture to from about 16% to about 18%; boiling the admixture to precipitate a composite hydrate of the anatase modification; and calcining the composite hydrate at a temperature of from about 900° C. to about 975° C. to convert a substantial portion of the anatase modification to rutile.

3. A process for the manufacture of a composite pigment material comprising titanium dioxide in rutile form and calcium sulfate in the anhydrite form consisting of the steps of: forming a titanium sulfate slag solution; adjusting the ratio of iron sulfate to titanium dioxide in said slag solution to within the range of about 0.6 to about 2.00 by dissolving an iron sulfate fraction in said solution; mixing said slag solution with an aqueous calcium sulfate slurry; adjusting the sulfuric acid concentration of the admixture to from about 16% to about 18%; boiling the admixture to precipitate a composite hydrate; and calcining the composite hydrate at a temperature from about 900° C. to about 975° C. to convert a substantial portion of the calcined composite hydrate to rutile.

4. A process for the manufacture of a composite pigment material comprising titanium dioxide in rutile form and calcium sulfate in the anhydrate form consisting of the steps of: forming a titanium sulfate slag solution; adjusting the ratio of iron sulfate to titanium dioxide in said slag solution to within the range of about 0.6 to about 2.0 by dissolving ferrous sulfate in said slag solution; mixing said slag solution with an aqueous calcium sulfate slurry; adjusting the sulfuric acid concentration of the admixture to from about 16% to about 18%; boiling the admixture for a period of time sufficient to precipitate a composite hydrate of the anatase modification; and calcining the precipitated hydrate at a temperature of from about 900° C. to about 975° C. for a period of about 4 hours to convert a substantial portion of the anatase modification to rutile.

5. A process for the manufacture of a composite pigment material comprising titanium dioxide in rutile form and calcium sulfate in the anhydrite form consisting of the steps of: forming a titanium sulfate slag solution by digesting a titaniferous slag in concentrated sulfuric acid; adjusting the ratio of iron sulfate to titanium dioxide in said slag solution to about 1 by dissolving ferrous sulfate in said slag solution; mixing said sulfate slag solution with an aqueous calcium sulfate slurry; adjusting the sulfuric acid concentration of the admixture to about 17%; boiling the admixture for a period of about 4 hours to precipitate a composite hydrate of the anatase modification; and calcining the composite hydrate at a temperature of from about 900° C. to about 975° C. to convert a substantial portion of said anatase modification to rutile.

6. A process for the manufacture of a composite pigment material comprising titanium dioxide in rutile form and calcium sulfate in the anhydrite form consisting of the steps of: forming a titanium sulfate slag solution by digesting a titaniferous slag in concentrated sulfuric acid; adjusting the ratio of iron to titanium dioxide in said sulfate slag solution to about 1.50 by dissolving ferrous sulfate in said slag solution; mixing said slag solution with an aqueous calcium sulfate slurry; adjusting the sulfuric acid concentration of the admixture to about 18.5%; boiling the admixture for a period of about 4 hours to precipitate out a composite hydrate of the anatase modification; and calcining the composite hydrate at a temperature of from about 900° C. to about 975° C. to convert the anatase modification to rutile.

7. A process for the manufacture of a composite pigment material comprising titanium dioxide in rutile form and an extender consisting of the steps of: boiling an admixture comprising an extender selected from the group consisting of calcium sulfate, barium sulfate and strontium sulfate and a titanium sulfate slag solution formed by digesting a mixture of titaniferous ore and slag in concentrated sulfuric acid wherein the ratio of iron sulfate to about 2.0 to precipitate a composite hydrate; adjusting titanium dioxide is in the range of from about 0.6 ing the sulfuric acid concentration of the admixture to from about 16% to about 18%; and calcining the composite hydrate at a temperature from about 900° C. to about 975° C. to convert the calcined composite hydrate to rutile.

References Cited in the file of this patent
UNITED STATES PATENTS

| 2,269,139 | Booge | Jan. 6, 1942 |
| 2,307,048 | Keats | Jan. 5, 1943 |
| 2,316,840 | Cole | Apr. 20, 1943 |
| 2,333,663 | McCord | Nov. 9, 1943 |